United States Patent [19]

Morley

[11] Patent Number: 4,457,521
[45] Date of Patent: Jul. 3, 1984

[54] REINFORCED TRACK PIN ASSEMBLIES AND SEALS THEREFOR

[75] Inventor: James P. Morley, Arlington Heights, Ill.

[73] Assignee: CR Industries, Elgin, Ill.

[21] Appl. No.: 91,250

[22] Filed: Nov. 5, 1979

[51] Int. Cl.³ .......................... F16J 15/38; F16J 15/34
[52] U.S. Cl. .......................................... 277/92; 305/14
[58] Field of Search ................... 277/91, 92, 84, 189; 305/10, 11

[56] References Cited

U.S. PATENT DOCUMENTS

| | | | |
|---|---|---|---|
| 2,463,695 | 3/1949 | Jensen | 277/92 |
| 3,547,452 | 12/1970 | Hirata | 277/92 |
| 4,094,516 | 6/1978 | Morley | 277/92 |
| 4,195,852 | 4/1980 | Roley | 277/92 |

*Primary Examiner*—Robert I. Smith
*Attorney, Agent, or Firm*—James T. FitzGibbon

[57] ABSTRACT

An end face seal especially adapted for use in severe service environments such as for sealing track pins of crawler type tractors. The seal includes a primary annular seal, having a radially extending flange portion for contacting a mating surface in face sealing engagement and an axially extending flange portion, and a secondary annular sealing member positioned in use about the axial flange portion. The cross section of the secondary annular sealing member is shaped so as to accommodate both axial and radial compressive loads, and is preferably generally parallelogram-shaped in an unstressed condition. The seal also includes an annular reinforcing member of generally L-shaped cross section adapted to distribute the axial load to the seal face and to prevent radially outward deformation of the outermost portion of the radial flange of the primary seal ring.

6 Claims, 5 Drawing Figures

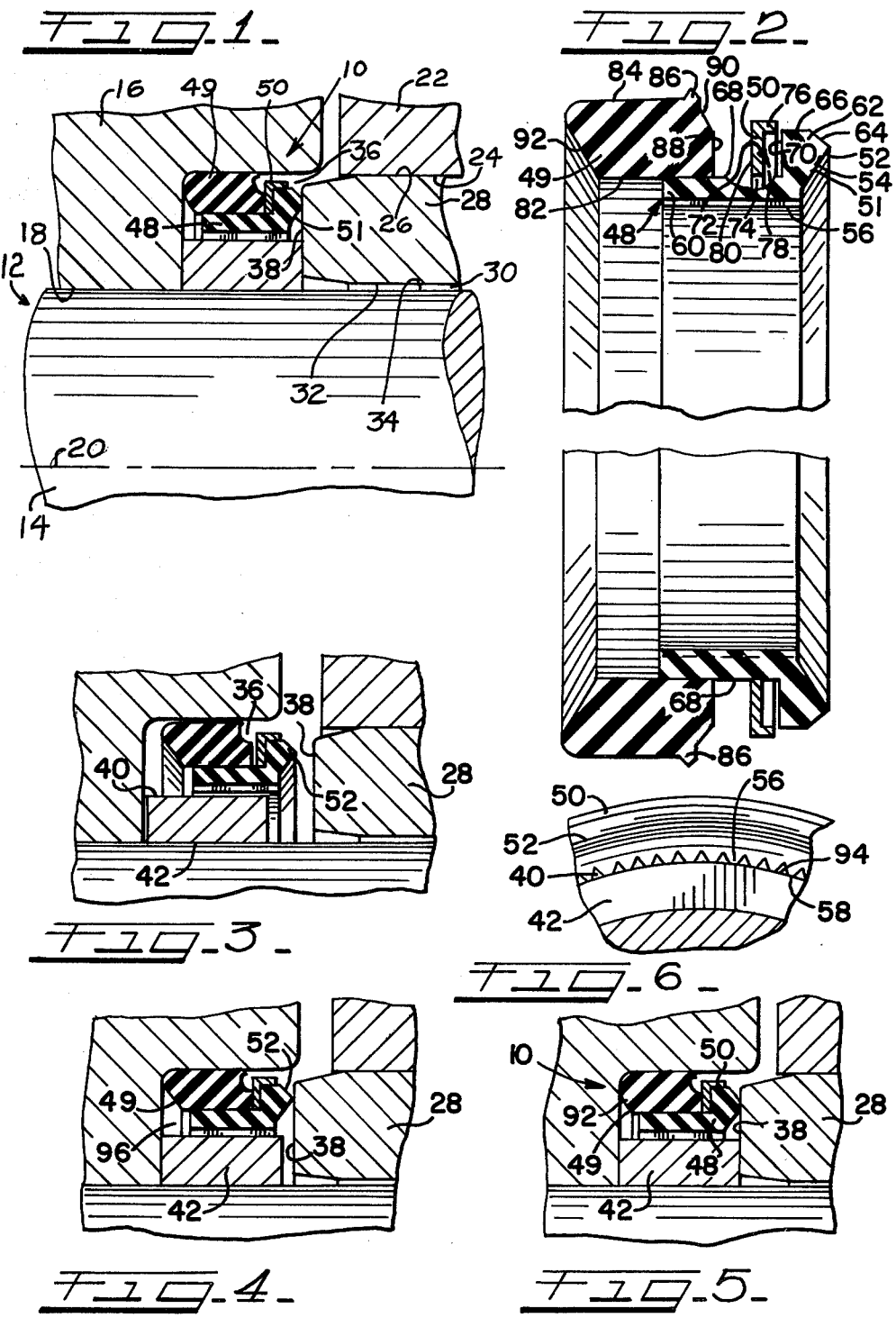

REINFORCED TRACK PIN ASSEMBLIES AND SEALS THEREFOR

BACKGROUND OF THE INVENTION

The present invention relates generally to seals, and more particularly, to seals adapted for specialized, severe service applications.

One application for which there have been a large number of seals proposed is that of the so-called track pins on crawler tractor equipment. Crawler tractors usually include a pair of tracks, and each track is in turn made up of inner and outer chains of track links. A large plurality of links, typically 30 to 40 links, are assembled into an endless chain, and two such chains are then trained over the front idler roller and the rear sprocket final drive as well as over a number of suspension track rollers and track-carrying idler rollers. The inner and outer links in each chain are held together by track pins and bushings which extend through openings at either end of the track links. Track shoes or grouser plates extend transversely between the respective links on the inner and outer chains. These shoes or plates form the surface which rests on the earth and ultimately supports and forms the traction for the vehicle. Thus, the right and left hand vehicle tracks each include a plurality of plates, with the plates extending between and joining the links in the inboard chain to the links in the outboard chain.

Because track vehicles are particularly designed for use under severe conditions, namely, mud, sand, grit, ice and snow, rocky terrain, etc., and because the track is the portion of the vehicle which comes into the most direct and frequent contact with these severe conditions, track pins and their bushings are subject to rapid wear.

Numerous track pin seal designs have been proposed, and some of them have been proved successful in use to a certain extent; however, most crawler vehicles either use no track pin seals, or use rudimentary forms thereof, such as, for example, metal Belleville washers placed back to back, etc. Because each track contains a large number of pins, the expense of a seal is an important consideration in adopting it.

Considering the design and use environment of crawler tractors and the track links and pins and bushings thereof, an ideal track pin seal is one which will accommodate a relatively great degree of axial dimensional variation, whether such dimension occurs as a result of cumulative tolerances in manufacturing (so-called "tolerance stack up") or results from stresses and strains in use, and of course, eventual wear. As a corollary of the foregoing facts, it will be appreciated that metal Belleville washer type seals or other seals having a high axial spring rate are not highly desirable for an application of this type. An ideal track pin seal is one which has an axial spring rate which is moderate or fairly low, and yet which will generate an initial axial force which is sufficient to insure that the seal can successfully exclude water and grit and retain lube, even under conditions of minimum load. Because of the ever-increasing cost of machine parts, and the high cost of maintenance and labor, there has been and still is a great need for a really effective track pin seal. Because of user requirements generally, and more specifically, because of government and other regulations, noise reduction has recently assumed great importance and an effectively sealed and lubricated track chain is much less noisy than an unsealed, unlubricated chain.

According to the present invention, one seal which has provided excellent performance with moderate cost is described and claimed in U.S. Pat. No. 4,094,516, and the present invention is an improvement on the seal of such patent. An improved seal is provided which has most or all of the advantages of highly expensive prior art seals, which provides them at low initial cost, and which contains still further improvements over the low cost seals which incorporate such advantages. The seal of the invention applies proven principles, but uses structures and materials which are different from the prior additional structural elements in order to provide new operating characteristics and advantages.

In view of the need referred to above for an improved, highly reliable low cost seal for track pins and related applications, it is an object of the present invention to provide a novel seat for track pins and similar applications.

Another object of the invention is to provide a track pin seal having reinforcing structure adapted to improve reliability and long term life without much increase in low initial cost.

Another object of the invention is to provide a seal which utilizes a novel arrangement of an end face, an end face support, a mating surface, and axial loading member therefor.

A still further object is to provide an end face seal using two different elastomeric materials, and a reinforcing unit, the softer of which elastomer provides an axial end load application and torque transmission capability in all types of weather conditions, the harder of which elastomer provides outstanding wear resistance, and a metal or other hard reinforcing unit, with the softer element also providing a secondary or relatively static seal between itself, the harder member and the part of the track link in which it is received, and the reinforcing unit aiding performace while being incorporated into low cost form.

Another object of the invention is to provide a seal wherein the primary seal ring receives a radial compressive load from the secondary seal member, and which resists undue radial deformation by reason of having portions of such primary seal ring engage a part of the track pin itself, and in which the axial load is distributed and controlled by a stiffener or reinforcing member.

A still further object is to provide a reinforced track pin seal in which the primary seal member is supported by a portion of the track pin, and wherein the seal ring includes means permitting passage of oil from a reservoir area to the interface between the primary seal ring and the mating part.

Another object is to provide a track pin seal having three pieces and adapted to be supported by a track pin or a member associated therewith, with the so-called secondary seal member being adapted to transform an axially applied load into a combination of increased radial compressive load and a partially reduced axial load, and with the axial load applied to the primary seal face being distributed and/or controlled by a stiffener or reinforcing unit.

A further object is to provide a seal unit having three pieces, one of which comprises a primary sealing ring of a tough, but resilient elastomeric material having excellent abrasion resistance, another of which comprises a secondary seal ring made from a softer elastomer, with the second ring and a third member, a stiffener, being adapted to cooperate in applying the loading forces necessary to create an effective sealing action.

The foregoing objects and advantages of the invention are achieved in practice by providing a seal unit having a generally annular secondary seal and force applying member of a characteristic shape, a primary seal ring of a stiff, elastomeric material having a generally L-shaped seat for receiving the secondary member, and having an axially directed end face portion adapted to contact a part of the track pin mechanism to be sealed, and a reinforcing member of generally annular shape with a L-shaped cross-section, adapted to receive and distribute the forces from the secondary member so as to maintain a sealing effect and reduce primary ring distortion, with the primary seal ring including plural axial passages extending between the axial ends of the primary seal ring to permit flow of lubricant therethrough even under difficult conditions.

The exact manner in which these and other objects and advantages are achieved in practice will become more clearly apparent when reference is made to the following detailed description of the preferred embodiments of the invention set forth by way of example and shown in the accompanying drawings, in which like reference numbers indicate corresponding parts throughout.

BRIEF DESCRIPTION OF THE DRAWINGS

FIG. 1 is a vertical sectional view, with portions broken away, showing the seal of the invention in place within a seal cavity forming part of a track pin assembly for a crawler tractor or the like;

FIG. 2 is a partially exploded vertical sectional view, with portions broken away, taken on an enlarged scale and showing the seal of FIG. 1;

FIG. 3 is a view similar to FIG. 1 but showing the seal during the process of installation and before the installed parts are assembled;

FIG. 4 is a view similar to FIG. 3, but showing the seal in an installed position under conditions of minimum axial load;

FIG. 5 is a view similar to FIGS. 3 and 4 but showing the seal installed and in a condition of maximum axial load; and FIG. 6 is a fragmentary end elevational view of the seal of the invention, showing details of the inner constructional diameter of the primary seal ring of the invention.

DESCRIPTION OF THE PREFERRED EMBODIMENTS OF THE INVENTION

While it will be understood that seals made according to the present invention may be useful in a number of environments, the invention will be particularly described with respect to a preferred embodiment wherein the sealed medium is oil, e.g., an EP 90 grade oil, and wherein the sealed mechanisms are the track pins in the endless track of links making up the track chain of a crawler type tractor.

Referring now to FIG. 1, the seal of the invention, generally designated 10, is shown to be in an installed position within a track link assembly generally designated 12.

FIG. 1 shows a cylindrical track pin 14, having an end cap or like part 16 which is tightly secured, as by a press fit, along the interface 18 between an inner diameter of the end cap 16 and the outer diameter of the track pin 14. These parts are arranged so as not to undergo movement relative to each other. In practice, the end cap 16 typically constitutes the leading portion of one track link, while the trailing portion of the same link is press fit over a bearing or bushing which in turn is free to rotate with respect to the following track pin.

In FIG. 1, a section of a counterpart end portion 22 of a preceding track link is shown, with the end 22 having a radially inwardly directed cylindrical surface 24 defining an opening for receiving the outer diameter 26 of a track pin bushing 28. A slight working clearance 30 is shown to exist between the inner diameter 32 of the track pin bushing 28 and the outer diameter 34 of the track pin 14, the center line axis of which is shown at 20.

Accordingly, the track link 22 and the bushing 28 are pressed together and do not move with respect to each other, but instead move as a unit with respect to the track pin 14. The end cap portion 16 of the preceding link is fixed to the pin 14. This permits the pin 14 to oscillate with respect to one end of the track line, thus permitting the track as a whole to articulate at each link joint as the chain of links travels over the radii defined by the front idler and the rear sprocket of the tracked vehicle.

Referring now to the working environment of the seal, a seal-receiving cavity 36 is shown in FIGS. 1 and 3-5 to be defined in part by a mating surface 38 which is an annular, radially extending, axially directed end face portion of the bushing 28. The radially outwardly directed face 40 of a spacer ring 42 defines the inner diameter of the cavity 36, which is further defined by a radially extending end wall 44 and an axially extending wall 46, the latter two walls defining the seal-receiving counterbore in the end cap 16 of one of the track links.

The seal assembly 10 is disposed within the cavity 36 and includes three principal elements, an annular primary seal ring 48, an annular, elastomeric secondary seal body 49, and a reinforcing or stiffening member 50. The primary seal ring 48 includes a slightly inclined end face surface 51 terminating at a primary sealing edge 52. A margin 54 of the surface 51 nearest the sealing edge 52 may also, as wear occurs, form a part of the seal band or sealing surface which actually engages the end face mating surface 38 (FIG. 3) on the bushing 28 to create the primary seal.

The inner diameter of the primary ring 48 comprises a plurality of teeth or serrations 56 shown in detail in FIG. 6 to have their inner portions 58 snuggly engaging the outer diameter 40 of the spacer 42. As will appear, an important feature of the invention is that the serrated inner diameter of the primary seal ring is supportingly engaged by the spacer 42 so as to counteract the radial compressive forces applied to the primary ring.

Referring particularly to FIGS. 2 and 3, it is shown that the primary seal ring body includes an axially extending flange 60, a radially extending flange 62, a rearwardly inclined outer front surface portion 64 and a top surface 66. The outer surface 68 of the axial flange and the rear surface 70 of the radial flange meet along a circular line and cooperate to form a seat 72 for the reinforcing member 50 and the secondary seal ring 49. In particular, the reinforcing member 50 includes a radial flange 74, axial flange 76 and a forwardly directed radially extending face 78 as well as a rearwardly directed face 80. The secondary seal ring 49 includes an axially extending inner radial surface 82, a radially outer counterpart surface 84, a mounting barb 86 and a forwardly directed radial face 88, in addition to inclined front and rear body defining surfaces 90, 92. When the seal assembly 10 is preassembled, the ring 50 is fitted over the axial flange 60 of the primary seal ring 48, and move to the position of FIG. 3, where it occupies a portion of the seat 72. When this ring 50 is so positioned, the axial flange 70 thereof overlies the surface 66 and the radial face 88 of the secondary seal ring 49 tightly abuts the rear surface 72 of the ring 50. Moreover, the inner surface 82 of the ring 49 overlies the axially extending outer diameter of the primary ring 48 with a sliding or slight interference fit in the relaxed or uninstalled position of these parts.

Referring now to FIG. 3, the seal is shown preassembled and inserted into the seal cavity 36. The end face 38 of the bushing 28 is spaced apart from the edge 52 of the primary seal ring and the elastomeric secondary seal body 49 is in its relaxed or as-manufactured state. FIG. 4 shows the seal when the bushing 28 has been moved axially a distance sufficient to cause engagement between surface 38 and the edge 52. In this condition, the secondary ring 49 is slightly compressed axially, causing the roughly parallelogram-shaped cross-section thereof to assume a slightly more upright or planar shape. This applies and end face axial load to the edge 52 through the reinforcing member 50.

The action of the secondary seal ring is such that, by possessing a certain amount of both axial and radial freedom, it acts as a spring to apply not only an axial end face load so as to develop primary sealing pressure along the seal band formed by the edge 52 and the adjacent margin 54, but also to apply a radial compressive load to the axial flange 60 of the ring 48, maintaining it in snug engagement with the spacer 42 on which it is supported. Because the primary sea ring is elastomeric, application of a radial compressive load would deform the seal unless it were supported.

According to the invention, this support is provided by the spacer-engaging teeth 56 on the ring 48. The serrated formation of the inner diameter of the ring 48 provides a plurality of axially extending oil passages 94 which serve to permit the ring 48 to move axially without undue resistance and which utilize the portion 96 (FIG. 4) behind the seal in the sealing cavity 36 for storage of oil.

Referring now to FIG. 5, the seal 10 is shown in a condition of reduced installed height or under a condition of great axial load. This shows that the parallelogram-shaped cross-section of the secondary ring 49 has become more upright, with the wall 92 bulging outwardly and with the primary ring 48 and the stiffener 50 being moved to the left as shown in FIG. 5. In this view, the bushing 28 is shown with its end surface 38 engaging the spacer 42, so that further axial movement will not occur.

A further description of the installation and operation of the seal of the present invention is set forth in U.S. Pat. No. 4,094,516, over which the present seal forms an improvement. According to the present invention, the reinforcing ring 50 provides several important functions. First, when an axial compressive load is applied to certain prior art seals, it is possible that the entire radial flange 62 of the primary ring can be deflected axially rearwardly, causing the seal band, instead of comprising the edge 52 and its immediately adjacent areas, to comprise the entire inner front surface 51 of the ring. The reinforcing ring 50 of the present invention resists frustoconical deflection and maintains the geometry of the sealing edge even though considerable axial load is applied to the seal and although the primary ring 48 is made from an elastomer. Moreover, the reinforcing ring distributes the axial load, reducing stresses and wear within the primary ring. The axial flange 76 of the reinforcing ring 50 overlies the surface 66 and prevents it from deforming outwardly and interfering with the desired seal geometry. The foregoing advantages are achieved at very low cost with great simplicity, without compromising the ability of the primary ring to absorb a radial compressive load as long as it is supported by the spacer 42.

As is known to those skilled in the art, the increase in radial compressive load which results from an increased axial load is an important feature of the invention because it increases the ability of the seal to transmit torque from the counterbore through the secondary ring to the primary ring when such torque transmission is most needed. In other words, relative motion between the sealing edge 52 and the face 38 is insured rather than permitting relative rotation and wear between other parts of the seal and the sealed mechanism.

Referring now to another aspect of the invention, the secondary seal ring 49 has been referred to as having a generally parallelogram-shaped cross-section, and reference to such shape is also made in U.S. Pat. No. 4,094,516. According to the invention, it is not necessary that this cross-section be, speaking from a strict geometric standpoint, a true parallelogram. Because the basic requirement is that the body be shaped so as to apply an increased radial compressive load in response to an applied axial load, it is necessary that space be provided between the secondary ring and associated parts of the sealed mechanism to permit axial compression, radial and axial bulging, and a change of overall shape in response to the applied loads and their reactive forces. Consequently, the term "generally parallelogram-shaped cross-section" or words of like import will be understood to mean seal rings of the shape illustrated, and their functional equivalents.

Referring now to the preferred composition of the elements of the present seal, the secondary seal ring 60 is preferably made from a relatively soft synthetic rubber material, the chemical composition of which is chosen based on the intended application of the seal. For sealing oil in track pin cavities, a nitrile ("Buna N") rubber compounded or formulated for cold temperature flexibility which undergoes relatively small change of stiffness with changes in ambient temperature and which has a "Shore A" Durometer of hardness of about 50–60 is preferred. Other suitable rubber materials, including those of different chemical compositions and physical properties, are well known to those skilled in the seal art, and include "hydrin" (epichlorohydrin-based) rubbers.

Referring now to the primary seal ring 48, this element is preferably made from a tough, abrasion resistant elastomer such as a polyurethane rubber, preferably a material with a 90–100 Durometer (Shore A) hardness.

While different materials and formulations are suitable for this purpose, specific compositions which have been found useful are referred to in U.S. Pat. No. 4,094,516.

In the seal art, seals for track pins, track rollers and the like, are referred to as having an "operating height" which, in relative dimensions, is indicative of the degree to which the seal assembly is compressed axially. Maximum operating height occurs when the axial extent of the bottom or shoulder of the counterbore is spaced axially farthest from the portion of the primary seal ring member which forms the seal band. Minimum operating height occurs when the seal band-forming portion of the primary member lies closest to the shoulder or bottom portion of the counterbore. A specified or typical operating height lies between these two extremes, and is a height which is sought to be, but is not always, achieved in practice. The variations in operating height occur because of the working clearances required to permit operation of the machine, as well as because of the need for reasonable manufacturing tolerances. The seal accommodates changes in working height primarily by compression of the secondary or spring member and, to a much less extent, by deflection or compression of portions of the primary seal member.

If a seal is operated at more than the maximum operating height, it may fail to seal because the assembly is not compressed axially in an amount sufficient to create the required end or axial loading force on the seal band; in other words, the two primary sealing members which rotate relative to each other are not being urged toward each other with the requisite force to create a lubricant-retaining, dirt-excluding seal. On the other hand, when the seal is compressed beyond the permissible minimum working height, compression of the secondary member is at a maximum, and further compression will create such extreme axial forces that the seal parts will extrude the film of lubrication from between them, and will then rapidly fail in use by reason of excessive friction and the high temperatures typically accompanying such conditions.

Seals made according to the present invention are able to be manufactured at a cost which is only slightly greater than the cost of counterpart seals which do not include the specially constructed reinforcing member referred to herein, but are able to provide improved performance with respect to such prior art seals and to particularly provide improved reliability. The elements of the seal can be constructed from freely available, relatively low cost materials and do not require machining or other finishing to extremely close tolerances. In use, the seals provide excellent performance in several applications, and are particularly effective in providing noise reduction as well as dirt exclusion and lubricant retention.

It will thus be seen that the present invention provides a novel end face seal unit having a number of advantages and characteristics including those pointed out above and others which are inherent in the invention. A preferred embodiment of the invention having been described by way of illustration, it is anticipated that changes and modifications of the described end face seal unit will occur to those skilled in the art and that such changes and modifications may be made without departing from the spirit of the invention or the scope of the appended claims.

I claim:

1. An end face seal unit for use in severe service environments, said assembly comprising, in combination, a primary annular sealing ring having a generally axially extending flange portion and a generally radially extending flange portion, said axial flange having respective inner and outer diameter surfaces and said axial flange having generally radially extending front and rear surface portions, said front surface portion of said radial flange having a portion thereof adapted to engage a mating surface in snug end face sealing engagement therewith when urged axially toward said mating surface, a secondary sealing member of generally annular form, said secondary member including generally axially extending inner and outer diameter surfaces and front and rear surface portions, said front and rear surfaces having at least portions thereof inclined forwardly and inwardly such that said secondary member, in the unstressed condition thereof, has a generally parallelogram shaped cross section, and a stiffening insert member of generally L-shaped cross section and having radial and axial flange portions, said insert member having the front face of its radial flange abutting said rear surface of said radial flange of said primary seal ring, and said insert axial flange overlying and confining the radially outer edge of said primary seal ring radial flange, said inner diameter of said secondary member being received in use over said outer diameter of said axial flange portion of said primary seal ring, with at least a portion of said front surface of said secondary seal member engaging at least a portion of the rear surface of said stiffening insert member, said primary member being made from a relatively stiff but resilient first elastomeric material, said secondary member being made from a second resilient elastomeric material which is substantially less stiff than said first material, and said insert member being substantially stiffer than said primary member, said axial flange portion of said primary member being adapted to be supported in use on the inner diameter thereof by a portion of an element being sealed thereby.

2. A seal unit as defined in claim 1 wherein said stiffening insert is made from metal.

3. A seal unit as defined in claim 1 wherein said front surface portion of said radial flange comprises a pair of generally frustoconical surfaces meeting each other along a circular locus to form a seal band, said seal band being disposed axially outwardly of the remainder of said front surface portions in the direction of a mating seal surface with which said seal will be associated in use.

4. A seal unit as defined in claim 1 in which said inner diameter of said secondary seal member includes means at least partially defining oil passages extending axially from said front surface portion of said radial flange to the rear of said axial flange.

5. A seal unit as defined in claim 1 in which said secondary member, in use, is deformed under the application of an axial load to said seal such that said front and rear surfaces thereof bulge outwardly, said parallelogram-shaped cross-section being also distorted so that said inner and outer diameter surfaces thereof are moved toward a position of radial alignment.

6. A combination track pin and seal assembly for use in a track laying vehicle, said assembly comprising, in combination, at least one track pin, and end cap-receiving counterbore therein, a cylindrical bushing received over said track pin in sliding relation, said bushing being adapted to receive thereover a part of a track link, said bushing including a radially extending end face portion adapted to cooperate with a seal band forming portion of an oil seal, a generally cylindrical spacer unit disposed over a said track pin and lying radially within said seal receiving counterbore and axially between an end wall of said counterbore and said end face of said bushing, and a seal unit disposed with said counterbore, said seal unit including a stiff elastomeric primary seal ring of generally L-shaped cross-section and having axial and radial flanges with the front surface of said radial flange having a seal band forming edge thereon, said edge being adapted to engage said end face on said bushing in fluid tight relation, said axially entending flange portion of said primary ring having means on the inner diameter thereof for engaging the outer diameter of said spacer, a radially outer axial surface on said axial flange and a radially extending rear surface forming a part of said radial flange, a generally annular stiffener unit of L-shaped cross-section, said stiffener having the front surface of the radial flange thereof abutting said primary ring radial flange rear surface and the axial flange of said stiffener overlying the radially outer end of said radial flange in confining relation, and a secondary seal member of generally annular form and having a generally parallelogram shaped cross-section in the unstressed condition thereof, said secondary seal member being made from an elastomeric material and having an outer diameter engaging a portion of said counterbore, an inner diameter received over said outer axial surface of said primary ring axial flange, and a radially inner front surface abutting the rear surface of said radial flange of said insert.

* * * * *